Aug. 5, 1930. W. J. MILLER Re. 17,761

APPARATUS FOR PRODUCING MOLD CHARGES

Original Filed March 20, 1926 5 Sheets-Sheet 1

INVENTOR.
William J. Miller
BY
Robert N. Brown
ATTORNEY

Aug. 5, 1930. W. J. MILLER Re. 17,761
APPARATUS FOR PRODUCING MOLD CHARGES
Original Filed March 20, 1926 5 Sheets-Sheet 2
Fig. 2
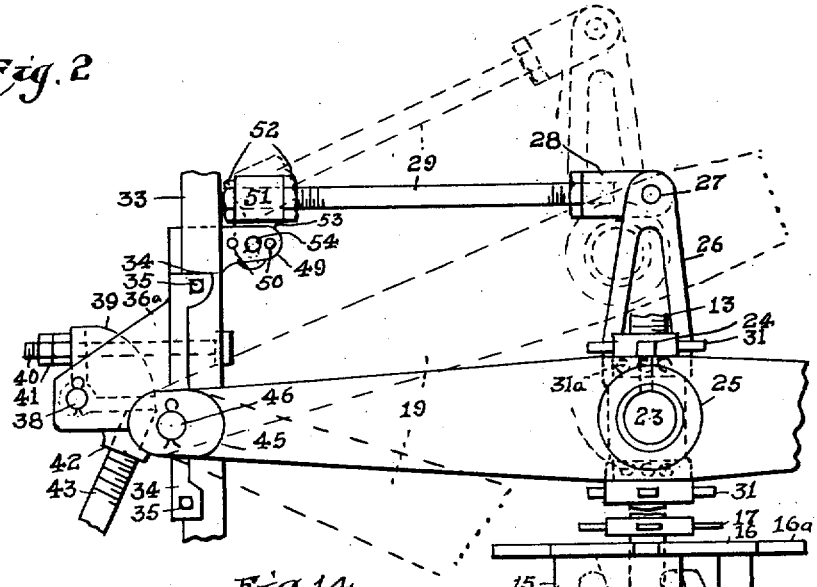
Fig. 14
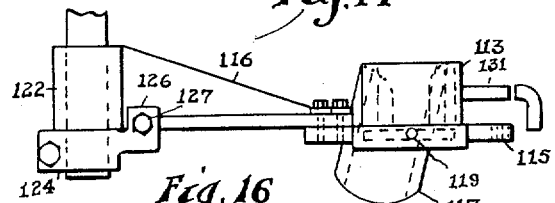
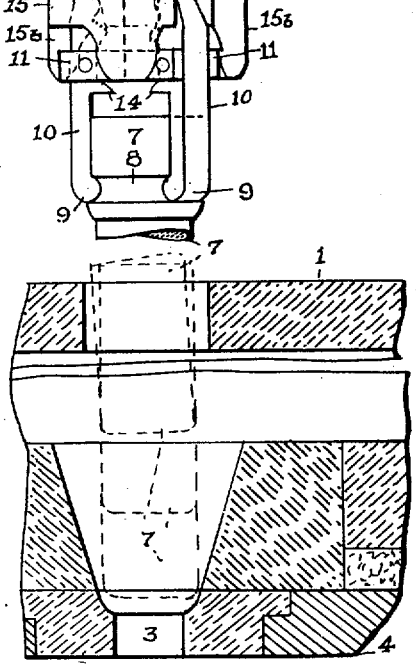
Fig. 16
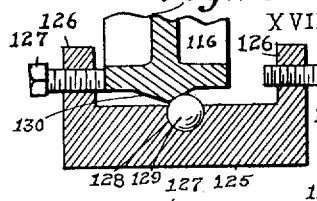
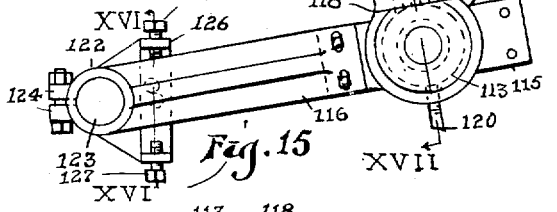
Fig. 15
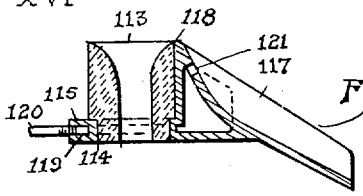
Fig. 17
INVENTOR
William J. Miller
By Robert D. Brown
Attorney Aug. 5, 1930. W. J. MILLER Re. 17,761

APPARATUS FOR PRODUCING MOLD CHARGES

Original Filed March 20, 1926 5 Sheets-Sheet 3

INVENTOR

William J. Miller,

By Robert S. Brown

Attorney

Aug. 5, 1930. W. J. MILLER Re. 17,761

APPARATUS FOR PRODUCING MOLD CHARGES

Original Filed March 20, 1926 5 Sheets-Sheet 4

INVENTOR.
William J. Miller
BY Robson S. Brown
ATTORNEY

INVENTOR.
William J. Miller
BY Robson & Brown
ATTORNEY

Reissued Aug. 5, 1930

Re. 17,761

REISSUED

UNITED STATES PATENT OFFICE

WILLIAM J. MILLER, OF SWISSVALE, PENNSYLVANIA, ASSIGNOR TO HARTFORD-EMPIRE COMPANY, OF HARTFORD, CONNECTICUT, A CORPORATION OF DELAWARE

APPARATUS FOR PRODUCING MOLD CHARGES

Original No. 1,738,479, dated December 3, 1929, Serial No. 96,199, filed March 20, 1926. Application for reissue filed May 5, 1930. Serial No. 449,995.

My present invention relates to automatic feeders for producing a succession of mold charges of molten glass, and comprises certain new and useful improvements in the mounting of and in the means for imparting movement to the rigid implement employed to control the discharge of the glass from the outlet of the feeder receptacle, in the means for regulating and adjusting the positions and movements of said implement, and in the new and improved combined mold charge-guide and cullet-chute.

Other novel features of construction, and also of arrangement of parts will appear from the following description.

In the accompanying drawings, wherein I have illustrated the best embodiment of the principles of my invention now known to me, Figure 1 is a front elevation of a mold charge feeder to which my present invention is applied, the rigid implement being shown in its intermediate position and the feeder receptacle and other elements being broken away in section;

Fig. 2 is a partial front elevation on enlarged scale with the feeder receptacle shown in vertical section and the different positions of the rigid implement being indicated in dotted lines;

Fig. 14 is a side elevation of the combination funnel guide and cullet chute;

Fig. 15 is a top plan view of the same;

Fig. 16 is an enlarged section taken along the line XVI—XVI in Fig. 15;

Fig. 17 is a section taken along the line XVII—XVII in Fig. 15;

Figure 1:
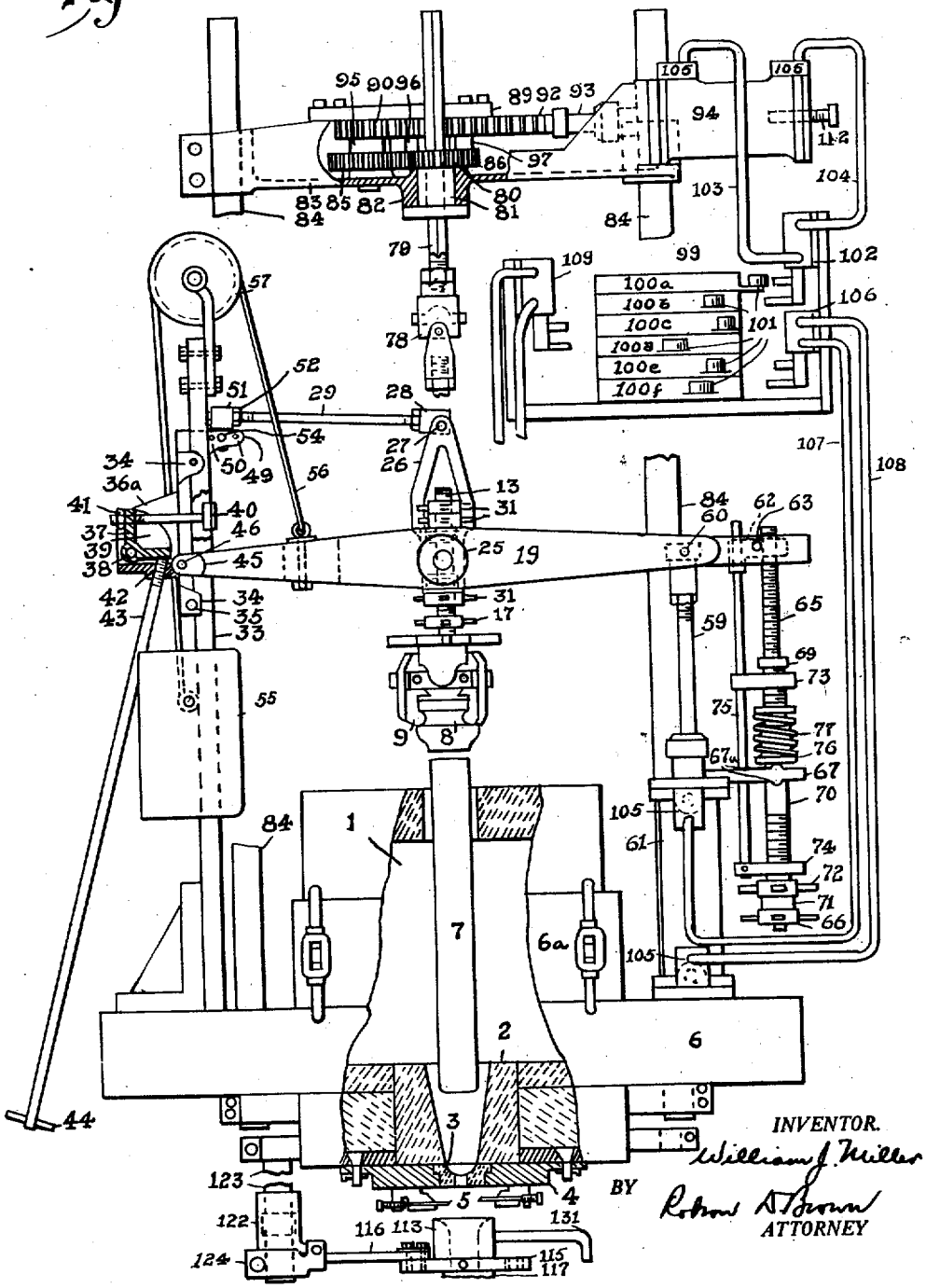
Figure 8:
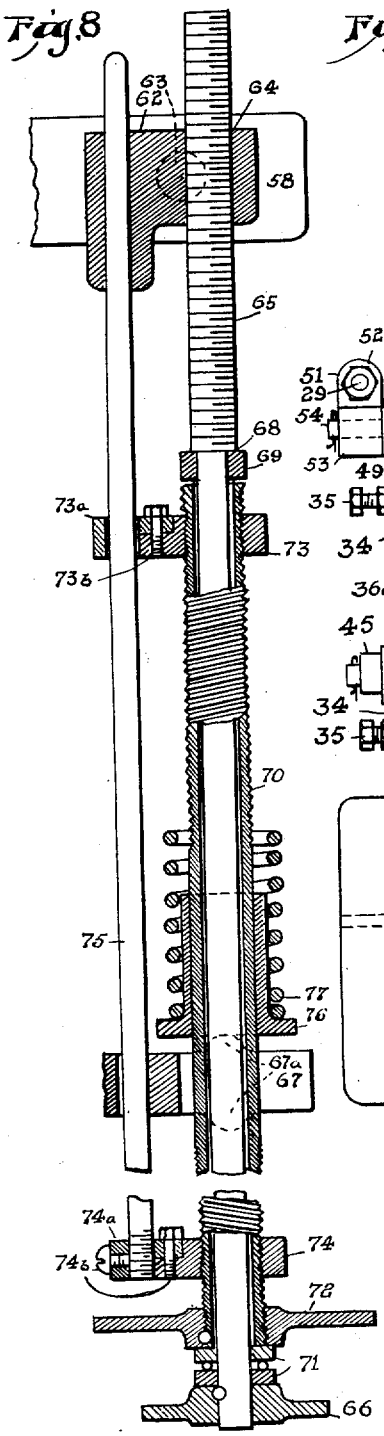
Fig. 8 is a detail showing the receptacle in horizontal section and illustrating the lateral adjustment of the rigid instrument relative to the discharge outlet.
Figure 3:
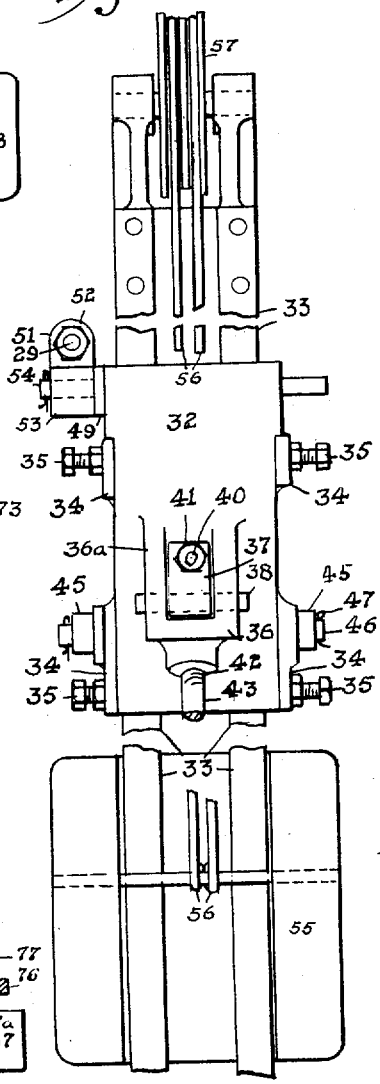
Fig. 3 is a partial side elevation looking from the left in Fig. 1 and showing on enlarged scale the twin standards, the adjustable fulcrum block and the counter-balance.

Referring to the drawings, 1 represents the feeder receptacle which is usually a boot or shallow extension of the continuous tank, and which is provided with a discharge outlet submerged by the molten glass in the tank. The main portion of the discharge outlet is shown comprised of the downwardly tapered bore of a clay liner 2 which occupies an opening in the floor of the boot 1, while the lower end of the outlet is formed by the bore of a clay orifice bushing 3 which may support the liner 2 in place and is itself interchangeable to produce columns or extrusions of glass of different diameters. Thus the orifice bushing 3 is removably held in place, as by an apertured plate 4. 5 represents the mechanical shears which are employed at proper intervals to sever the glass depending from the outlet.

The boot 1 is exteriorly provided with the platform 6, preferably a metal casting and integral with or supported by the metal casing 6[a] of the boot.

7 represents a rigid, preferably clay implement, hereinafter referred to, for convenience as a "plunger" which depends through an opening in the roof of the boot 1 into the molten glass and in alinement with the outlet, and means are provided for moving the plunger toward and away from the outlet to control the discharge of molten glass through the outlet.

The upper end of the plunger is preferably provided with an enlarged head and has a circumferential groove 8 which is engaged by the jaws 9 of the chuck at equally spaced points. Said jaws are preferably three in number, and are each formed on the lower end of an arm 10. Said arms are pivotally mounted intermediate of their ends between the pairs of pierced ears 11 integral with and disposed radially of the head 12 which is screwed and pinned on the lower end of the plunger stem 13. It will be noted that the metal of the arms 10 is so placed that when the arms are released their lower or jaw ends swing outwardly, thus spreading the jaws 9 into their inoperative or non-gripping positions. Upper and lower stops 14 are provided to limit the arc of movement of the arms in either direction, by engagement with the head 12.

15 represents a double-acting wedging ring which is loosely mounted on the stem 13 and is employed to wedge the jaws 9 into engagement with the plunger when the plunger is installed, and also to wedge the jaws out of engagement with the plunger when the plunger is to be removed from the chuck.

For the first of these purposes the ring 15 is provided with a plurality of downwardly tapered exterior surfaces 15[a] equal in number to the jaw arms and correspondingly spaced about the wedging ring. Thus when the ring 15 is turned on the plunger stem into the position relative to the jaw arms 10 shown in Fig. 4, the wedging surfaces 15[a] engage the upper ends of the jaw arms from within, thus wedging the jaws 9 into engagement with the groove 8 of the plunger and clamping the plunger to the chuck. Interposed between the wedging surfaces 15[a], the ring 15 is provided with an equal number of depending lugs 15[b] which are provided on their inner faces with inclined surfaces which are adapted to engage the upper ends of the jaw arms from without, thus as the ring descends, separating the jaws 9 from their engagement with the groove 8 of the plunger. Thus when it is desired to release the plunger from the chuck, the ring 15 is raised from its position shown in Fig. 4 and then turned to bring the projections 15[b] into alinement with the jaw arms and the ring is then moved downwardly, thereby spreading jaws, which may tend to adhere to the plunger, apart.

16 is a metal disk which is fixed to the top of the ring 15, as by screws, serving as a shield or deflector for the heat ascending up along the plunger from the receptacle 1. The disk is preferably provided with radial spokes 16[a] to facilitate the raising and lowering and the turning of the ring 15.

It is evident that the weight of the ring 15 and disk 16 will at all times maintain the jaws 9 in firm engagement with the plunger, thus automatically taking up any tendency toward slackness in the grip of the jaws due to the contraction or expansion of the material of the plunger.

Figure 4:
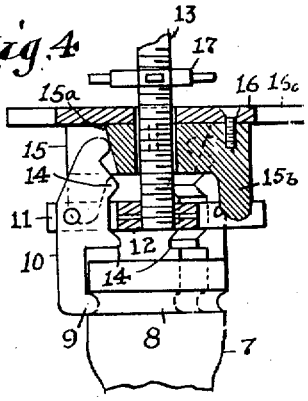
Fig. 4 is a sectional view, taken along the line IV—IV in Fig. 6, of the chuck by means of which the rigid implement is suspended from the oscillating lever, the implement being shown gripped by the chuck.
Figure 6:
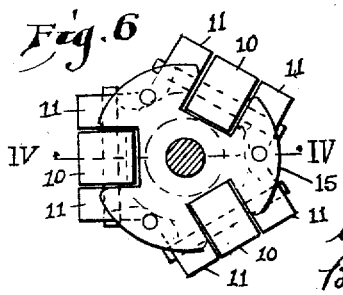
Fig. 6 is a plan view of the chuck with the shield and wedging ring removed and the implement stem shown in section.
Figure 12:
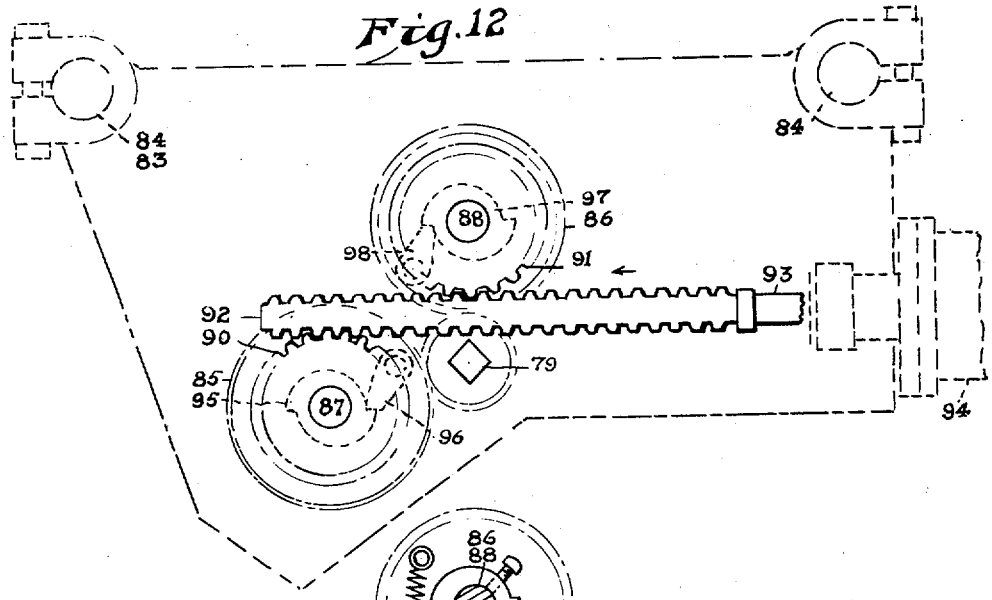
Fig. 12 is a top plan view showing the means for rotating the rigid implement, the top plate being shown in dotted lines.
Figure 13:
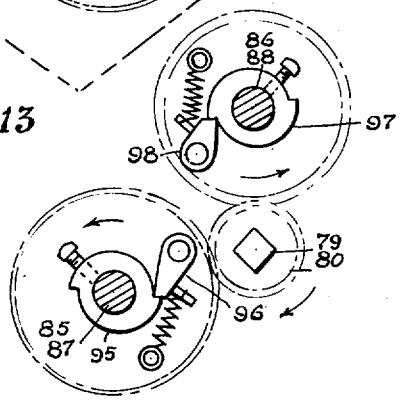
Fig. 13 is a diagrammatic view of the same showing the pinion and pawl mechanism.
Figure 11:
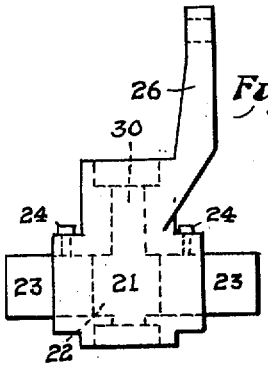
Fig. 11 is a side elevation, on enlarged scale, of the yoke by means of which the rigid implement is pivotally supported from the lever.

Usually the weight of the ring 15 when in the position shown in Fig. 4 is sufficient to hold the jaws in proper engagement with the plunger but as an additional security for instance when the plunger is working in relatively stiff glass, I may provide a clamping nut 17 on the stem 13 which may be screwed down against the ring 15 to hold it in place.

It is evident that as the jaws assume their separated positions when free, the installation of a plunger is easy, as is also the dismounting of the plunger.

19 is the oscillating lever which is employed to impart reciprocal motion to the plunger 7. The mounting of the lever will be later described.

The lever is provided intermediate of its ends with an aperture 20 in which the yoke 21 is mounted to swing on an axis transverse to the longitudinal axis of the lever 19. Thus I show the yoke provided with a horizontal bore 22 in the ends of which extend the trunnion pins 23 which are fixed as by set screws 24 while the outer ends of the trunnions are journaled in bearings 25 formed in the lever 19 at either side of the aperture 20.

At one side, preferably turned to the rear of Figs. 1 and 2, the yoke 21 is provided with an upwardly extending stand 26 to the upper end of which is pivotally attached, as by pin 27, the sleeve 28 into the socket of which is screwed the end of the parallel-throw link 29.

The yoke 21 is provided with a vertical bore 30 intersecting the bore 22, and through which extends the threaded plunger stem 13. 31 are positioning nuts on said stem above and below the yoke whereby the stem 13 and the plunger 7 depending from said yoke may be raised or lowered relative to the yoke 21 and the lever 19. The upper and lower ends of the bore 30 are countersunk to provide seats for the antifriction or roller bearings 31[a] against the casings of which the nuts 31 are screwed. These roller bearings prevent any lateral or vertical play of the plunger relative to the lever 19.

32 represents the member or block upon which the lever 19 and the parallel-throw link 29 are fulcrumed. 33 represents a pair of spaced apart and vertically disposed standards erected on the platform 6. The fulcrum block is mounted against the outer faces of said standards, and at either vertical edge is provided at its top and bottom with a forwardly extending ear 34 having threaded holes through which set screws 35 are screwed to impinge against the outer edges of the standards.

At its lower end the block 32 is provided with a horizontal shelf 36 provided with vertical side walls 36[a] which merge at the front with the block 32. 37 is an angular bracket pivotally mounted at its angle between said side walls 36[a] of the shelf 36 on the bolt 38. The bracket 37 is strengthened by segmental side walls 39. 40 is a bolt which extends rearwardly between the standards 33, the head of said bolt bearing against the face of the standards and having a shouldered portion which fits between the latter. The shank of the bolt extends loosely through a hole in the upwardly extending wing of the bracket 37, and has a nut 41 screwed on its end and adapted to bear against the bracket 37.

The shelf 36 is provided with the inwardly inclined and threaded hole 42 through which is screwed the upper end of the clamping rod 43 whose lower end is provided with a cross-handle 44. The upper end of the rod impinges from beneath against the horizontal wing of the bracket 37, as shown in Fig. 1. By screwing upon the rod 43 the bracket is tilted rearwardly against the nut 41 on the bolt 40, thus tightening the bolt and clamping the block 32 rigidly to the standards. By unscrewing the rod 43, the bolt 40 may be loosened and the block 32 then may be raised or lowered on the standards; the rod 43 being then screwed up again to retighten the bolt and clamp the block 32 in position.

Figure 18:
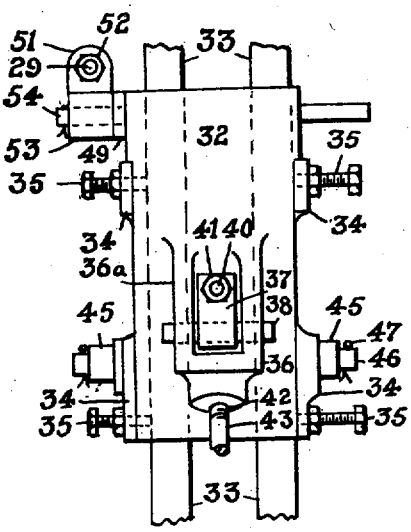
Fig. 18 is a broken side elevation taken similarly to Fig. 3 and showing the fulcrum block shifted laterally to the left from its position in Fig. 3.
Figure 19:
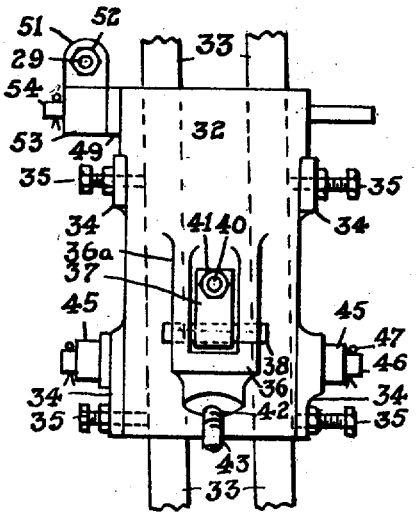
Fig. 19 shows the fulcrum block tilted laterally out of its vertically disposed position shown in Fig. 3.

It is evident that by adjusting the set screws 35 the fulcrum block may be shifted horizontally relative to the standards, as shown in Fig. 18; that is toward the front or the rear of the feeder, or by the proper adjustment of the set screws the fulcrum block may be tilted laterally in a plane parallel to that of the standards, as shown in Fig. 19.

Figure 10:
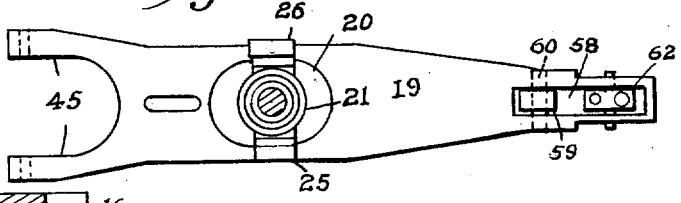
Fig. 10 is a plan view of the lever from which the rigid implement is suspended.
Figure 5:
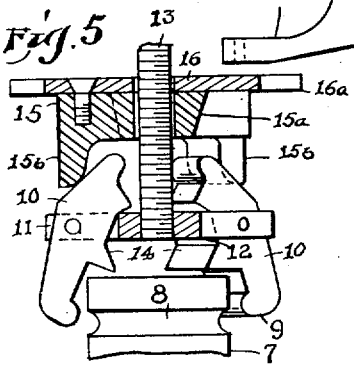
Fig. 5 is a view similar to Fig. 4 but showing the jaw-arms spread to release the rigid implement.

One end of the lever 19 is bifurcated, as shown in Fig. 10, to straddle the standards 33 and the fulcrum block 32, and is provided with opposed sleeves 45 in which are journaled the outer ends of the pin 46 which extends through a horizontal sleeve opening in the lower portion of the block. The pin is provided with washers and cotter pins 47 at its ends to prevent its longitudinal movement from place.

49 is a lug integral with and extending inwardly from the upper portion of the block 32 and said lug is provided with a plurality of holes 50 horizontally alined and spaced apart. 51 is a sleeve which is slipped on the outer end of the parallel throw link 29, the position of the sleeve relative to the link being regulated by the nuts 52 which are screwed on the link on either side of the sleeve, the end of the link being threaded to receive said nuts. Depending from the sleeve is a pierced ear 53, a pivot pin or bolt 54 extending through said ear and through one of the holes 50 in the lug 49.

It is evident that the fulcrum point of the parallel throw link 29 is inside of the fulcrum point of the oscillating lever 19.

By adjusting the fulcrum point of the link 29, which may be accomplished by shifting the pin 54 to the proper hole 50 of the lug 49, the desired movement of the plunger may be obtained. Thus the lower end of the plunger may be arranged to move in a vertical line in relation to the orifice, as indicated by the dotted lines in Fig. 2, or if desired, the point where the plunger enters the glass may be maintained the same as the plunger rises and falls.

The plunger and its mounting are counterbalanced by the weight 55 slidable on the lower portion of the standards 33 and connected to the lever 19 by cables 56 running up through holes in the shelf 36 and over a sheave 57 mounted on the upper ends of the standards. Thus the load of the plunger and its mounting on the reciprocating means yet to be described is counterbalanced and also the shifting of the fulcrum block relative to the standards for the purposes of adjustment is facilitated.

The other or "free" end of the lever 19 is provided with a longitudinally disposed slot 58 and in the inner end of said slot the upper end of the piston rod 59 is pivotally attached by means of the cross-pin 60 which extends through a horizontally slotted hole in the cross head of the piston rod. The piston rod is attached to the piston of the vertically disposed fluid-pressure cylinder 61 mounted on the platform 6. It is apparent that the plunger 7 may be reciprocated relative to the discharge outlet by means of the fluid-pressure cylinder and piston mechanism.

62 is a block pivotally mounted on the trunnion pin 63 in the outer end of the slot 58, said block being also provided with a threaded hole 64 extending up through the same. 65 is a rod having its threaded upper end screwed into said hole. The lower end of said rod is provided with a hand-grasp 66 pinned thereon, so that the rod may be rotated to raise or lower it in the threaded hole 64 and relative to the lever 19. It is apparent that the rod 65, depending from the lever 19, ascends and descends in unison with the plunger 7.

67 is a fixed abutment which may project from the head of the cylinder 61 and which is provided with a slot through which the rod 65 loosely depends.

The threaded upper portion of the rod 65 is of larger diameter than the lower portion of the rod, thus providing between said portions a shoulder 68, and 69 is an annular washer slid up on said rod against said shoulder.

A sleeve 70 is slipped up on the rod against the washer 69 and is supported from below by the anti-friction bearing member 71 which is held in place by the hand-grasp 66. The sleeve 70 is provided at its lower end with the hand-grasp 72 pinned in place thereon, and by means of which the sleeve may be rotated on the rod.

The intermediate portion of the sleeve 70 is unthreaded but its upper and lower ends are provided with oppositely disposed threads These threads may be of the same or different pitch. 73 is a limiting nut screwed on the upper threaded portion of said sleeve and above the abutment 67 while 74 is a similar nut screwed on the lower portion of said sleeve and below said abutment. The nuts are prevented from rotation by means of a rod 75 whose lower end is fixed in a block 74[a] which may be clamped rigid with the nut 74 by the bolt 74[b] and extends through a hole in the block 73[a] clamped rigid with the nut 73 by the bolt 73[b], and in the block 62. The limiting nuts are employed to define or limit the path of movement of the sleeve 70 and consequently of the rod 65 relative to the abutment, and thus define the movement of the plunger when the same is reciprocated.

76 represents a spring guard slidably mounted on the sleeve 70 above the abutment 67 and below the nut 73, and carrying the helical spring 77 which loosely encircles the sleeve 70 and is first encountered and compressed by the nut 73 as the rod 65 moves downwardly with the plunger 7, forcing the spring guard down on the abutment and finally halting the downward movement of the plunger by the compression of the spring. As the fluid-pressure is next relieved from the upper end of the cylinder 61, which is simultaneous with the admission of fluid-pressure to the lower end of the cylinder, the spring 77 quickly expands, its stored power driving the nut 73 upwardly and thus imparting a rapid initial upward movement to the plunger, thereby either lifting the sheared stub up into the outlet, or attenuating the neck of or "necking" the mold charge prior to shearing, depending on whether the plunger is arranged to start its upward movement subsequent to or after the shears cut.

The spring 77 also by its progressive resistance to compression slows down the plunger as it approaches its low position.

As the plunger continues to rise, the nut 74 moves upwardly and halts the upward movement of the plunger by its contact with the abutment 67.

It is thus evident that the limiting nut 73 determines the low position of the plunger while the limiting nut 74 determines the high position of the plunger.

The abutment 67 is preferably provided at either side of its slot with rounded bosses 67[a] which are engaged by the moving limiting means, and thereby insuring proper engagement regardless of the lateral movement or swing of the rod 65 due to the oscillation of the lever 19.

It is further evident that the rotation of the rod 65 in the proper direction will cause said limiting nuts to be raised or lowered in unison, thus raising or lowering the path of movement of the plunger.

It is further evident that by rotating the sleeve 70 in the proper direction the nuts 73 and 74 may be caused to approach each other or to separate, thus shortening or lengthening the path of movement of the plunger.

With the rod 75 removed the nuts 73 and 74 may be independently adjusted on the sleeve 70, thus providing means for varying the low position of the implement without changing its high position, and vice versa.

By providing the two end portions of the sleeve 70 with threads of different pitch, the nuts will be caused to travel on the sleeve but at varying speeds, thus providing for the simultaneous adjustment of both the high and low positions of the plunger but to different degrees.

By disconnecting the block 73[a] from the nut 73, the rotation of the sleeve in the proper direction will raise or lower the lower limiting nut 74 without varying the position of the upper limiting nut 73, thus providing for the adjustment of the high position of the plunger without varying its low position. Again by disconnecting the block 74[a] from the nut 74 while the block 73[a] remains clamped to the nut 73, a rotation of the sleeve 70 will effect an adjustment of the low position of the plunger without varying its high position.

Figure 7:
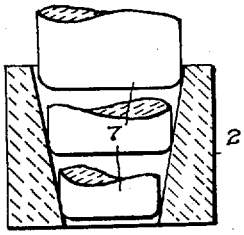
Fig. 7 is a detail showing the relation of different diameters of plungers to the discharge outlet when in their low positions.
Figure 9:
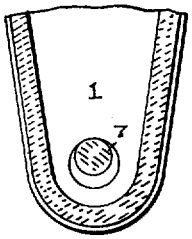
Fig. 9 is an enlarged detail of the means employed for limiting the movement of the rigid implement and for adjusting the limits of and the path of its movement.

In Fig. 7 I have illustrated the low positions of plungers of three different diameters in relation to a liner 2. The importance of providing means for adjusting the low position of the plunger relative to the outlet is thus apparent.

Furthermore in suspended gob feeding, variations in the positions of the plunger relative to the outlet are employed in producing gobs of different shapes and sizes.

Again the lateral adjustment of the plunger relative to the outlet is important. For instance the plungers being formed of clay are frequently not straight or they may become warped from usage, and may be or become out of proper alinement with the outlet. It is an observed fact that the glass in the nose of the receptacle at the front side of the outlet is colder and more viscous than that on the side of the outlet nearest the melting tank, and therefore, as the hotter and more fluid glass tends to pass down through more quickly, the discharge may not be uniform in cross section. I correct this tendency by adjusting the plunger nearer to the rear or hotter side of the outlet, thus equalizing the flow and preventing a lop-sided extrusion.

The alinement of the plunger relative to the front and rear of the orifice may be adjusted by shifting or tilting the fulcrum plate 32 in a plane parallel to that of the standards 33 through the proper adjustment of the individual set screws 35.

The path of movement of the plunger relative to the outlet may also be raised or lowered by raising or lowering the fulcrum block 32 on the standards 33.

The fulcrum block may also be raised on the standards to elevate the plunger out of the bath of molten glass in the boot for repairs to or replacement of the plunger and for other purposes.

The parallel throw link 29 functions to maintain the lower end of the plunger 7 always in the same vertical path in alinement with the discharge outlet, as shown in dotted lines in Fig. 2, notwithstanding the elevation of the plunger or the tilting of the lever 19 and the plunger during their movement.

I provide means for imparting a rotary movement to the plunger in addition to its reciprocal movement, thus keeping mixed the mass of molten glass in the receptacle 1 and avoiding the formation of strata and zones of glass of different temperatures and degrees of viscosity.

The plunger stem 13 is extended above the yoke 21 and is connected by the flexible joint 78 with a shaft 79 which is squared to slidably fit the squared bore of a pinion 80 whose depending hub 81 is journaled in a sleeve bearing 82 on the horizontally disposed casting 83 supported from the platform 6 by the standards 84. There is sufficient play between the shaft and the bore of pinion 80 to prevent interference with the vertical reciprocation of the shaft in unison with the plunger.

85 and 86 represent a pair of opposed pinions, preferably of greater diameter than the pinion 80 and both in mesh therewith. Said pinions are loose on vertically disposed shafts 87 and 88, respectively, said shafts being journaled between the casting 83 and the top plate 89 attached to the casting.

Near their upper ends the shafts 87 and 88 have fixed thereon the pinions 90 and 91, respectively, said last named pinions meshing with the opposite side of the double-rack bar 92 which is attached to the piston 93 of the fluid-pressure cylinder and piston mechanism 94 which is horizontally mounted on the casting 83.

It is evident that an outward movement of the rack-bar 92 rotates the pinion 90 and its shaft 87 counterclockwise and the pinion 91 and its shaft 88 clockwise, while an inward movement of the rack bar rotates the pinion 90 and its shaft 87 clockwise and the pinion 91 and its shaft 88 counterclockwise.

It is further evident that if the pinions 85 and 86 were fast to the shafts 87 and 88, the plunger 7 would be rotated first in one direction and then in the other direction. However, it is desirable to impart rotation in one direction only to the shaft, and I therefore provide therefor by arranging the pinions 85 and 86 so that they each receive rotation in one direction only from their shafts.

Thus the shaft 87 is provided with a ratchet disk 95 fixed thereon with the tooth-shoulders facing counterclockwise and I provide the adjacent face of the loose pinion 85 with a spring pressed pawl 96 which is engaged by one of the disk teeth when the shaft 87 is rotated counterclockwise, so that the pinion 85 is rotated counterclockwise and imparts a clockwise rotation to the plunger 7 while the rack bar is moving outwardly, but the pawl 96 trails idle over the teeth of the disk while the rack bar is moving inwardly so that the pinion 85 is idle.

In like manner I fix a second ratchet disk 97 on the shaft 88 with its tooth-shoulders facing counterclockwise and provide the adjacent face of the pinion 86 with a spring pawl 98 which engages the disk 97 when during the inward movement of the rack bar the shaft 88 is rotated counterclockwise but which permits the pinion 86 to remain idle during an outward movement of the rack bar.

It is thus apparent that the pinion 80 and the shaft 79 are always rotated clockwise; by the pinion 85 while the rack bar is moving outwardly, and by the pinion 86 while the rack bar is moving inwardly. Thus the plunger is rotated in one direction only by the reciprocation of the rack bar.

Preferably a timed relation is maintained between the reciprocal and rotary movements of the plunger. Thus I prefer that the rotary movement ceases as the plunger enters the outlet or attains its low position. I preferably impart one or more complete revolutions to the plunger during a longitudinal movement thereof, the rotary movement however ceasing as the plunger approaches the end of a stroke. For this purpose I provide means for properly and adjustably synchronizing the reciprocation and rotation of the plunger.

Thus in Fig. 1 I illustrate a timing device 99, shown of the rotary type described and claimed in Letters Patent of the United States No. 1,540,894, issued to me on June 9, 1925.

It is apparent that any other suitable timing device capable of the necessary adjustment may be substituted, such, for instance, as the reciprocating timing device described and claimed in Letters Patent of the United States No. 1,549,206, issued to me on August 11, 1925.

In Fig. 1 the timing device 99, as will more fully appear by reference to said Letters Patent No. 1,540,894, is provided with a plurality of annuli 100[a], 100[b], 100[c], 100[d], 100[e] and 100[f] mounted concentrically about a common axis and rotated in unison, said annuli 100 being each provided with a striking roller 101, and the several annuli being adjustable rotarily about their common axis of movement. 102 is a double-acting rotary valve, such as shown and described in said Letters Patent No. 1,540,894, aranged to be actuated in opposite directions by the rollers 101 of the annuli 100[a] and 100[b], said valve being connected to the opposite ends of the plunger rotating cylinder 94 by the pipes 103 and 104 respectively. It is understood that when the valve 102 is actuated in one direction, the fluid pressure is admitted to one end of the cylinder and relieved from the other end thereof, and when the valve is actuated in the other direction the fluid pressure is relieved from said first mentioned end and relieved from the second mentioned end. The pipes 103 and 104 are provided adjacent to the cylinder with adjustable cushion valves 105, similar to the cushion valves described in my patent application Serial No. 325,616, filed in the United States Patent Office on September 23, 1919, and employed to regulate the rate of relief of fluid pressure from in front of the advancing cylinder.

Again the similar rotary valve 106 which is actuated in opposite directions by the rollers 101 of the annuli 100[e] and 100[f] is connected by the pipes 107 and 108 to the opposite end of the plunger reciprocating cylinder 61, adjustable cushion valves 105 being also provided at either end of the cylinder. Again the rotary valve 109 actuated in either direction by the rollers 101 of the annuli 100[c] and 100[d] is connected to the shear operated cylinder, not shown, by the pipes 110 and 111.

The plunger rotating cylinder 94 is also shown provided with an abutment screw 112 screwed through a threaded hole in its rear end whereby the inward movement of the cylinder may be halted at any predetermined point.

It is evident that the moments of actuation of the rotary valves and thus the instants of the reversal of the application of pressure to the corresponding cylinders may be regulated by adjusting the relation of the annuli 100 of the timing device 99. It is further evident that by the adjustment of the cushion valves 105 and thereby regulating the escape of pressure from in front of the piston, the speed of the rotation of the plunger and also its speed of its vertical movement in either direction may be regulated.

It is thus evident that the rotary and reciprocating movements of the plunger may be regulated and given any mutual relation as may be deemed advantageous.

I provide a guide which conducts the mold charges, when sheared, to the molds or other receptacle to which they are supplied. In my present invention I combine with the guide a cullet chute for directing the mold charges into the cullet pit when, for any reason, it is not desired to deliver them to the molds or other receptacle.

Thus the operation of the fabricating machine may be interrupted while the feeder continues to produce and deliver mold charges, or it may be desirable to interrupt the delivery of mold charges while repairs or adjustments are being made to the fabricating machine without stopping the feeder.

I therefore arrange the guide and cullet chute so that either one may be positioned below the shears and in alinement with the discharge outlet, so that when in normal use the guide will be positioned to deliver the mold charges to the fabricating machine but when desired the cullet chute may be substituted to carry away the mold charges.

Thus 113 is a guide, shown as of funnel shape and having its lower end reduced and shouldered to fit into the circular socket 114 of a plate 115 which is provided at either side with a pair of slotted bolt holes by means of which it may be adjustably bolted to the outer end of a bracket 116. Bolt holes are provided at either side so that the plate 115 may be reversed in relation to the bracket 116. At one side the plate 115 is provided with an integral cullet chute 117 whose upper end is at the same level as the upper end of the guide 113. The guide 113 has a flatened portion of its outer wall which fits against the inner end of the chute structure, as shown at 118, thereby preventing the rotation of the guide in its socket.

The plate 115 is provided with a water chamber surrounding the socket 114 and supplied with cooling water through a port 119 to which is connected a flexible pipe 120. A plurality of ports 121 lead from said water chamber into the upper end of the slide so that the latter is provided with a film of water.

The other end of the bracket 116 is provided with a sleeve 122 through which depends the standard 123 extending down from the platform 6. 124 is a split collar which is clamped onto the standard 123 below the sleeve 122, thus supporting the bracket in such manner that it may be turned on a vertical axis. It is evident that by adjusting the collar 124 on the standard 123 the elevation of the guide and chute relative to the shears and outlet may be regulated.

The split collar 124 is provided with a horizontal platform 125 extending beneath the bracket 116 and provided at its ends with an upwardly extending lip 126 having a threaded hole therein through which is screwed an abutment screw 127 which adjustably limits the movement or swing of the bracket relative to the platform. At a point on its center line the platform is provided with a socket 128 containing a ball 129 which protrudes slightly above the platform surface. The under face of the bracket is provided at its center with a projection 130 comprising two oppositely inclined surfaces disposed transversely of the bracket. It is apparent that when the bracket is swung to bring the apex of the projection 130 past the ball 129 the movement of the bracket will be halted by contact with the end of the abutment screw at the side of the platform toward which the bracket is moving. It is further evident that the bracket will automatically maintain this position by gravity until it is intentionally swung in the opposite direction, the apex of the projection passing over the ball and the bracket coming to rest against the other abutment screw. The abutment screws are adjusted so that when the bracket engages one of the same, the upper one in Fig. 15, the guide 113 is positioned under the outlet of the feeder to direct the mold charges into the molds, and when the bracket engages the other abutment screw the cullet chute 117 is positioned under the outlet. A handle 131 may be attached to the guide 113, which may be grasped to shift the bracket from one position to the other.

Thus in case it is desired to divert the mold charges from the molds, as for instance while the feeder is being adjusted to produce the mold charges desired or in case the fabricating machine is temporarily stopped while feeder continues to operate the workman seizes the handle 131 and moves the cullet chute into position beneath the outlet. When it is desired to resume the fabrication of ware the workman again seizes the handle and positions the guide under the outlet. The adjustable abutment screws provide means for the accurate spotting of the guide and the cullet chute in position.

What I desire to claim is:—

1. In apparatus for producing a succession of mold charges of molten glass the combination with a receptacle for the molten glass having a submerged discharge orifice, of a rigid implement working in the glass in the receptacle to control the discharge of glass from said outlet, means for moving said implement toward and away from the outlet and unitary adjustment means for simultaneously raising the position of the implement nearest to the outlet and lowering the position of the implement remote from the outlet.

2. In apparatus for producing a succession of mold charges of molten glass the combination with a receptacle for the molten glass having a submerged discharge orifice, of a rigid implement working in the glass in the receptacle to control the discharge of glass from said outlet, means for moving said implement toward and away from the outlet, and unitary adjustment means for simultaneously lowering the position of the implement nearest to the outlet and raising the position of the implement remote from the outlet.

3. In apparatus for producing a succession of mold charges of molten glass, the combination with a receptacle for the molten glass having a submerged discharge orifice, of a rigid implement working in the glass in the receptacle to control the discharge of glass from said outlet, means for moving said implement toward and away from said outlet, and unitary means for simultaneously adjusting to different degrees the positions of said implement nearest to and most remote from said outlet.

4. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, upper and lower limiting stops to determine the positions of the implement nearest to and remote from the outlet, and unitary means for causing said stops to diverge and to converge.

5. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement and in relation to a fixed abutment, limiting stops adjustably mounted on said member on opposite sides of said abutment, and unitary means for adjusting the positions of said limiting stops on said member.

6. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement and in relation to a fixed abutment, limiting stops adjustably mounted on said member on opposite sides of said abutment, and means for simultaneously moving said stops toward or away from each other on said member.

7. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement and in relation to a fixed abutment, limiting stops adjustably mounted on said member on opposite sides of said abutment, and means for simultaneously moving said stops toward or away from each other on said member, said stops being arranged to move to different extents.

8. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement and in relation to a fixed abutment, limiting stops adjustably mounted on said member on opposite sides of said abutment, means for simultaneously adjusting said stops in unison relatively to said abutment and means for simultaneously moving said stops toward or away from each other on said member.

9. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement in relation to a fixed abutment, a sleeve rotatable on said member, and limiting stops on said sleeve on either side of said abutment.

10. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement in relation to a fixed abutment, a sleeve rotatable on said member, limiting stops on said sleeve on either side of said abutment, and means whereby the rotation of said sleeve causes said stops to move relative thereto to adjust the movement of the implement relative to the outlet.

11. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement in relation to a fixed abutment, a sleeve rotatable on said member, said sleeve being exteriorly threaded, and limiting nuts screwed on said sleeve on either side of said abutment, said nuts being held against rotation, whereby the rotation of said sleeve causes the adjustment of the positions of the implement nearest to and most remote from the outlet.

12. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement in relation to a fixed abutment, a sleeve rotatable on said member, said sleeve being exteriorly provided on either side of the abutment with threads of opposite pitch, and limiting nuts screwed on said threads and held against rotation with said sleeve, whereby the rotation of said sleeve causes said nuts to approach or separate.

13. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement in relation to a fixed abutment, a sleeve rotatable on said member, said sleeve being exteriorly provided on either side of the abutment with threads of opposite pitch and different in angularity, and limiting nuts screwed on said threads and held against rotation with said sleeve, whereby the rotation of said sleeve causes said nuts to approach or separate at different speeds of movement.

14. In apparatus for producing a succession of mold charges of molten glass, the combination with a receptacle for the molten glass having a submerged discharge outlet, of a rigid implement working in the glass in the receptacle to control the discharge of glass from said outlet, means for moving said implement toward and away from the outlet, a member moving in unison with said implement in relation to a fixed abutment, a sleeve rotatable on said member, said sleeve being exteriorly provided on either side of the abutment with threads of different angularity, and limiting nuts screwed in said threads and held against rotation with said sleeve, whereby the rotation of the sleeve causes the nuts to travel at different speeds of movement.

15. In apparatus for producing a succession of mold charges of molten glass, the combination with a receptacle for the molten glass having a submerged discharge outlet, a rigid implement working in the glass to control the discharge of glass from said outlet, means including an oscillating lever for moving the implement toward and away from the outlet, a member connected with the lever and moved therewith in unison with the implement and in relation to a fixed abutment, limiting stops on said member on either side of the abutment to determine the path of movement of said implement, and means for varying the relation between said member and said oscillating lever.

16. In apparatus for producing a succession of mold charges of molten glass, the combination with a receptacle for the molten glass having a submerged discharge outlet, a rigid implement working in the glass to control the discharge of glass from said outlet, means including an oscillating lever for moving the implement toward and away from the outlet, a member connected with the lever and moved therewith in unison with the implement and in relation to a fixed abutment, limiting stops on said member on either side of the abutment to determine the path of movement of the implement, and means for adjusting the positions of said stops on said member, and means for varying the relation between said member and said oscillating lever.

17. In apparatus for producing a succession of mold charges of molten glass, the combination with a receptacle for the molten glass having a submerged discharge outlet, a rigid implement working in the glass to control the discharge of glass from said outlet, means including an oscillating lever for moving the implement toward and away from the outlet, a member connected with the lever and moved therewith in unison with the implement and in relation to a fixed abutment, a sleeve rotatable on said member, limiting stops on said sleeve on either side of the abutment, and means whereby the rotation of said sleeve causes adjustment of the positions of said limiting stops on said sleeve.

18. In apparatus for producing a succession of mold charges of molten glass, the combination with a receptacle for the molten glass having a submerged discharge outlet, of a rigid implement working in the glass in the receptacle to control the discharge of glass from said outlet, driving means including an oscillating lever for moving said implement toward and away from the outlet, a rod connected to said lever and moving in unison with said implement in relation to a fixed abutment, a sleeve rotatably mounted on said rod, said sleeve being exteriorly threaded on either side of the abutment, limiting nuts screwed on said sleeve on either side of said abutment, and means for adjusting said rod relative to said lever whereby said nuts may be adjusted in unison and relative to said abutment.

19. In apparatus for producing a succession of mold charges of molten glass, the combination with a receptacle for the molten glass having a submerged discharge outlet, of a rigid implement working in the glass in the receptacle to control the discharge of glass from said outlet, driving means including an oscillating lever for moving said implement toward and away from the outlet, a rod connected to said lever and moving in unison with said implement in relation to a fixed abutment, a sleeve rotatably mounted on said rod, said sleeve being exteriorly threaded on either side of the abutment, limiting nuts screwed on said sleeve on either side of the abutment, said nuts being held against rotation with said sleeve, whereby the rotation of said sleeve causes an adjustment of the positions of the nuts thereon, and means for adjusting the rod relative to the lever.

20. In apparatus for producing a succession of mold charges of molten glass, the combination with a receptacle for the molten glass having a submerged discharge outlet, of a rigid implement working in the glass in the receptacle to control the discharge of glass from said outlet, driving means including an oscillating lever for moving said implement toward and away from the outlet, a rod connected to said lever and moving in unison with said implement in relation to a fixed abutment, a sleeve rotatably mounted on said rod, said sleeve being exteriorly provided with threads of different angularity on either side of the abutment, limiting nuts screwed on said sleeve, means for preventing the rotation of said nuts with said sleeve whereby the rotation of said sleeve causes the movement of the nuts on the sleeve but at different rates of speed, and means for adjusting the rod relative to the lever.

21. In apparatus for producing a succession of mold charges of molten glass, the combination with a receptacle for the molten glass having a submerged discharge outlet, of a rigid implement working in the glass in the receptacle to control the discharge of glass from said outlet, driving means including an oscillating lever for moving said implement toward and away from the outlet, a rod connected to said lever and moving in unison with said implement in relation to a fixed abutment, a sleeve rotatably mounted on said rod, said sleeve being exteriorly provided with threads of opposite pitch on either side of the abutment, limiting nuts screwed on said threads, means for preventing the rotation of said nuts with said sleeve whereby the rotation of the sleeve causes said nuts to approach or separate, and means for adjusting the rod relative to the lever.

22. In apparatus for producing a succession of mold charges of molten glass, the combination with a receptacle for the molten glass having a submerged discharge outlet, of a rigid implement working in the glass in the receptacle to control the discharge of glass from said outlet, driving means including an oscillating lever for moving said implement toward and away from the outlet, a rod connected to said lever and moving in unison with said implement in relation to a fixed abutment, a sleeve rotatably mounted on said rod, said sleeve being exteriorly provided with threads of opposite pitch and different angularity, limiting nuts screwed on said threads, means for preventing the rotation of the nuts with said sleeve whereby the rotation of the sleeve causes said nuts to approach or separate but at different rates of speed, and means for adjusting the rod relative to the lever.

23. In apparatus for producing a succession of mold charges of molten glass, the combination with a receptacle for the molten glass having a submerged discharge outlet, of a rigid implement working in the glass to control the discharge of glass from said outlet, driving means including an oscillating lever for moving the implement toward and away from the outlet, a fulcrum member to which said oscillating lever is connected, and means for shifting said fulcrum member in a plane substantially at right angles to the plane of movement of the oscillating lever whereby to adjust the position of the fulcrum of said oscillating lever.

24. In apparatus for producing a succession of mold changes of molten glass, the combination with a receptacle for the molten glass having a submerged discharge outlet, of a rigid implement working in the glass to control the discharge of glass from said outlet, driving means including an oscillating lever for moving the implement toward and away from the outlet, and means for effecting an adjustment of the position of the fulcrum of the lever by tilting the axis of the same in a vertical plane.

25. In apparatus for producing a succession of mold charges of molten glass, the combination with a receptacle for the molten glass having a submerged discharge outlet, of a rigid implement working in the glass to control the discharge of glass from said outlet, driving means including an oscillating lever for moving the implement toward and away from the outlet, and means for effecting an adjustment of the position of the fulcrum of the lever by tilting the axis of the same in a vertical plane while the driving connections of the implement subsist.

26. In apparatus for producing a succession of mold charges of molten glass, the combination with a receptacle for the molten glass having a submerged discharge outlet, of a rigid implement working in the glass to control the discharge of glass from said outlet, driving means including an oscillating lever for moving the implement toward and away from the outlet, a fulcrum member to which said lever is pivotally connected. and means for adjusting the position of the fulcrum member by tilting its axis in a vertical plane.

27. In apparatus for producing a succession of mold charges of molten glass, the combination with a receptacle for the molten glass having a submerged discharge outlet, of a rigid implement working in the glass to control the discharge of glass from said outlet, driving means including an oscillating lever for moving the implement toward and away from the outlet, a fulcrum member to which said lever is pivotally connected, and means for adjusting the position of the fulcrum member by tilting its axis in a vertical plane while the driving connections of the implement subsist.

28. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, and means for adjusting the position of the fulcrum of said parallel throw lever.

29. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, and means for adjusting in unison the fulcrums of said lever and said link.

30. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally conected to said implement for moving the implement toward and away from the outlet, means for adjusting in unison the position of the fulcrums of said lever and said link, and means for independently adjusting the position of the fulcrum of said link.

31. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, and means for adjusting the position of the fulcrum of said link toward or away from its point of connection with the implement.

32. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, means for adjusting in unison the position of the fulcrum of said lever and said link, and means for independently adjusting the position of the fulcrum of said link toward or away from its point of connection to the implement.

33. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, and a common fulcrum member to which said lever and said link are both pivotally connected.

34. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, and an adjustably positioned and common fulcrum member to which said lever and said link are both pivotally connected.

35. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, a common fulcrum member to which said lever and said link are both pivotally connected, and means for adjusting the position of said fulcrum member.

36. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, a common fulcrum member to which said lever and said link are both pivotally connected, and means for adjusting the fulcrum point of said link relative to said member.

37. In apparatus for producing a succession of mold charges of molten glass, the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, a common fulcrum member to which said lever and said link are both pivotally connected, means for adjusting the position of said fulcrum member, and means for adjusting the fulcrum point of said link relative to said fulcrum member.

38. In apparatus for producing a succession of mold charges of molten glass. the combination with a receptacle for the molten glass having a submerged discharge outlet, of a rigid implement working in the glass to control the discharge of glass from the outlet, driving means including an oscillating lever and a parallel throw link both pivotally connected to said implement for moving the implement toward and away from the outlet, and means for counterbalancing the weight of said implement, lever and link.

39. In apparatus for producing a succession of mold charges of molten glass, the combination with a receptacle for the molten glass having a submerged discharge outlet, the molten glass being supplied to said receptacle at one side of said outlet, an implement working in the glass in the receptacle to control the discharge of glass from the outlet, and means for moving said implement toward and away from the outlet, the immersed end of said implement being eccentric of the axis of said outlet toward the hot glass side of the outlet.

40. In apparatus for producing a succession of mold charges of molten glass, the combination with a receptacle for the molten glass having a submerged discharge outlet, the molten glass being supplied to said receptacle at one side of said outlet, an implement working in the glass in the receptacle to control the discharge of glass from the outlet, and means for moving said implement toward and away from the outlet, the implement being so mounted that its lower end is nearer the hot glass side of the outlet as the implement moves toward the outlet thereby to equalize the discharge of glass from the outlet.

41. In apparatus for producing a succession of mold charges of molten glass, the combination of a receptacle for the molten glass having a submerged discharge outlet, the glass being supplied to the receptacle in such manner that the glass at one side of the outlet is the hottest, of a rigid implement working in the glass in the receptacle in relation to the outlet to control the flow of glass from the outlet, the axis of the path of movement of said implement being eccentric to the axis of the outlet and adjacent to the hottest side of the outlet to restrict the flow of glass therefrom.

42. In apparatus for producing a succession of mold charges of molten glass, the combination with a receptacle for the molten glass having a submerged discharge outlet, a rigid implement adapted to work in the glass in relation to the outlet to control the discharge of glass from the outlet, a supporting member for said implement, means for operating said supporting member to move said implement toward and away from the outlet, of an implement-holding chuck carried by said supporting member and comprising a plurality of swingingly mounted depending grasping members arranged to grasp the implement between them and means arranged to engage the upper ends of said grasping members to wedge the latter into engagement with the implement.

43. In apparatus for producing a succession of mold charges of molten glass, the combination with a receptacle for the molten glass having a submerged discharge outlet, a rigid implement adapted to work in the glass in relation to the outlet to control the discharge of glass from the outlet, a supporting member for said implement, means for operating said supporting member to move said implement toward and away from the outlet, of an implement-holding chuck carried by said supporting member and comprising a plurality of swingingly mounted depending grasping members arranged to grasp the implement between them and means movably mounted relative to the supporting member and arranged to engage the upper ends of said grasping members to wedge the latter into engagement with the implement.

44. In apparatus for producing a succession of mold charges of molten glass, the combination with a receptacle for the molten glass having a submerged discharge outlet, a rigid implement adapted to work in the glass in relation to the outlet to control the discharge of glass from the outlet, a supporting member for said implement, means for operating said supporting member to move said implement toward and away from the outlet, of an implement-holding chuck carried by said supporting member and comprising a plurality of swingingly mounted depending grasping members arranged to grasp the implement between them and means vertically slidable and arranged to engage the upper ends of said grasping members to wedge the latter into engagement with the implement.

45. In apparatus for producing a succession of mold charges of molten glass, the combination with a receptacle for the molten glass having a submerged discharge outlet, a rigid implement adapted to work in the glass in relation to the outlet to control the discharge of glass from the outlet, a supporting member for said implement, means for operating said supporting member to move said implement toward and away from the outlet, of an implement-holding chuck carried by said supporting member and comprising a plurality of movably mounted grasping members arranged to grasp the implement between them, and a member movably mounted on the chuck and arranged to force said members out of engagement with the implement.

46. In apparatus for producing a succession of mold charges of molten glass, the combination with a receptacle for the molten glass having a submerged discharge outlet, a rigid implement adapted to work in the glass in relation to the outlet to control the discharge of glass from the outlet, a supporting member for said implement, means for operating said supporting member to move said implement toward and away from the outlet, of an implement-holding chuck carried by said supporting member and comprising a plurality of movably mounted grasping members arranged to grasp the implement between them, and means for wedging said members out of engagement with the implement.

47. In apparatus for producing a succession of mold charges of molten glass, the combination with a receptacle for the molten glass having a submerged discharge outlet, a rigid implement adapted to work in the glass in relation to the outlet to control the discharge of glass from the outlet, a supporting member for said implement, means for operating said supporting member to move said implement toward and away from the outlet, of an implement-holding chuck carried by said supporting member and comprising a plurality of swingingly mounted grasping members arranged to grasp the implement between them and means carried by the chuck and arranged to engage said members for causing said grasping members to diverge to release the implement.

48. In apparatus for producing a succession of mold charges of molten glass, the combination with a receptacle for the molten glass having a submerged discharge outlet, a rigid implement adapted to work in the glass in relation to the outlet to control the discharge of glass from the outlet, a supporting member for said implement, means for operating said supporting member to move said implement toward and away from the outlet, of an implement-holding chuck carried by said supporting member and comprising a plurality of swingingly mounted grasping members adapted to converge and hold the implement between them, said grasping members being arranged to separate by gravity when released, and means for maintaining said grasping members in engagement with the implement.

49. In apparatus for producing a succession of mold charges of molten glass, the combination with a receptacle for the molten glass having a submerged discharge outlet, a rigid implement arranged to work in the glass in relation to the outlet to control the discharge of glass from the outlet, of an implement-supporting stem, means for reciprocating said stem to cause the implement to move toward and away from the outlet, and an implement-holding chuck carried by said stem and comprising a plurality of grasping members swingingly mounted on said stem and arranged to converge to grasp the implement between them and to diverge to release the implement, means for maintaining the grasping members in engagement with the implement, and wedge means for disengaging the grasping members from the implement.

50. In apparatus for producing a succession of mold charges of molten glass, the combination with a receptacle for the molten glass having a submerged discharge outlet, a rigid implement arranged to work in the glass in relation to the outlet to control the discharge of glass from the outlet, of an implement-supporting stem, means for reciprocating said stem to cause the implement to move toward and away from the outlet, and an implement-holding chuck carried by said stem and comprising a plurality of grasping members swingingly mounted on said stem and arranged to converge to grasp the implement between them and to diverge to release the implement, and a member movable in relation to the stem and arranged to cause by its various movements the grasping members to converge and diverge.

51. In apparatus for producing a succession of mold charges of molten glass, the combination with a receptacle for the molten glass having a submerged discharge outlet, a rigid implement arranged to work in the glass in relation to the outlet to control the discharge of glass from the outlet, of an implement-supporting stem, means for reciprocating said stem to cause the implement to move toward and away from the outlet, and an implement-holding chuck carried by said stem and comprising a plurality of grasping members swingingly mounted on said stem and arranged to converge to grasp the implement between them and to diverge to release the implement, and a member provided with oppositely disposed cam surfaces adapted to engage the grasping members and movable in relation to the stem whereby said last mentioned member may be moved into one position to cause the grasping members to converge and into another position to cause the grasping members to diverge.

52. In apparatus for producing a succession of mold charges of molten glass, the combination with a receptacle for the molten glass having a submerged discharge outlet, a rigid implement arranged to work in the glass in relation to the outlet to control the discharge of glass from the outlet, of an implement-supporting stem, means for reciprocating said stem to cause the implement to move toward and away from the outlet, and an implement-holding chuck carried by said stem and comprising a plurality of grasping members swingingly mounted on said stem and arranged to converge to grasp the implement between them and to diverge to release the implement, and a member provided with oppositely disposed cam surfaces adapted to engage the grasping members and rotatably mounted in relation to the stem whereby said last mentioned member may be moved into one position to cause the grasping members to converge and into another position to cause the grasping members to diverge.

53. In apparatus for producing a succession of mold charges of molten glass, the combination with a receptacle for the molten glass having a submerged discharge outlet, a rigid implement arranged to work in the glass in relation to the outlet to control the discharge of glass from the outlet, of an implement-supporting stem, means for reciprocating said stem to cause the implement to move toward and away from the outlet, and an implement-holding chuck carried by said stem and comprising a plurality of grasping members swingingly mounted on said stem and arranged to converge to grasp the implement between them and to diverge to release the implement, and a member provided with oppositely disposed cam surfaces adapted to engage the grasping members and rotatably and longitudinally slidably mounted in relation to the stem whereby said last mentioned member may be moved into one position to cause the grasping members to converge and into another position to cause the grasping members to diverge.

54. In apparatus for producing a succession of mold charges of molten glass, the combination with a receptacle for the molten glass having a submerged discharge outlet, a rigid implement arranged to work in the glass in relation to the outlet to control the discharge of glass from the outlet, of an implement supporting stem, means for reciprocating said stem to cause the implement to move toward and away from the outlet, and an implement-holding chuck carried by said stem and comprising a plurality of grasping members swingingly mounted on said stem and arranged to converge to grasp the implement between them and to diverge to release the implement, and a member rotatable and longitudinally slidable relative to said stem and provided with oppositely disposed cam surfaces adapted to engage the grasping members whereby by shifting the last mentioned member the grasping members may be caused to converge or diverge.

55. In glass feeding apparatus, a container for molten glass having a submerged outlet, an implement reciprocable in the glass in the container toward and from the outlet to regulate discharge of glass through the outlet and to aid in imparting a predetermined artificial shape to successive masses of discharged glass suspended below the outlet, and unitary means operable during the reciprocation of the implement for simultaneously adjusting the lower and upper limits of the strokes of the implement toward and away from each other to vary the shape imparting and flow regulating effects of the implement strokes.

56. In glass feeding apparatus, a container for molten glass having a submerged outlet, an implement reciprocable in the glass in the container toward and from the outlet, an oscillatory lever connected with said implement for reciprocating the latter, a reciprocable rod-like member connected with said lever, and a pair of stop members mounted on said rod-like member so as to be adjusted simultaneously toward or away from each other on relative angular turning movements of said rod-like member and said stop members about the axis of the rod-like member, said stop members being adapted to cooperate with stationary abutment means to limit the upward and downward strokes of the implement.

57. In glass feeding apparatus, a container for molten glass having a submerged outlet, an implement reciprocable in the glass in the container toward and from the outlet, an oscillatory lever connected with said implement for reciprocating the latter, a reciprocable rod-like member connected with said lever, a pair of stop members mounted on said rod-like member so as to be adjusted simultaneously toward or away from each other on relative angular turning movements of said rod-like member and said stop members, said stop members being adapted to cooperate with stationary abutment means to limit the upward and downward strokes of the implement, and means for causing said relative angular turning movement of said rod-like member and said stop members.

58. In glass feeding apparatus, a container for molten glass having a submerged outlet, an implement reciprocable in the glass toward and from the outlet, an oscillatory lever for reciprocating said implement, a rotatable and reciprocable rod-like member connected with said lever, said rod-like member having adjacent oppositely screw threaded portions, and a pair of stop members carried by the rod-like member and respectively in threaded engagement with said oppositely threaded portions of the rod-like member for limiting the strokes of the implement, said stop members being held against rotation about the axis of said rod-like member, whereby turning of the rod-like member about its axis will cause movement of said stop members toward or away from each other.

59. In apparatus for producing a succession of mold charges of molten glass, the combination with a receptacle for the molten glass having a submerged discharge outlet, of a rigid implement working in the glass in said receptacle in relation to the outlet to control the discharge of glass from the outlet, means to move the implement toward and away from the outlet, and means to rotate said implement comprising a rotator having a bore through which the stem of said implement extends, said implement stem being slidable in said bore but rotating with said rotator, and a reciprocating member arranged to drive said rotator.

60. In apparatus for producing a succession of mold charges of molten glass, the combination with a receptacle for the molten glass, having a submerged discharge outlet, of a rigid implement working in the glass in said receptacle in relation to the outlet to control the discharge of glass from the outlet, means to move the implement toward and away from the outlet, and means to rotate said implement comprising a rotator having a bore through which the stem of said implement extends, said implement stem being slidable in said bore but rotating with said rotator, and a reciprocating member arranged to drive said rotator in a constant direction.

61. In apparatus for producing a succession of mold charges of molten glass, the combination with a receptacle for the molten glass having a submerged discharge outlet, of a rigid implement working in the glass in said receptacle in relation to the outlet to control the discharge of glass from the outlet, means to move the implement toward and away from the outlet, and means to rotate said implement comprising a rotator having a bore through which the stem of said implement extends, said implement stem being slidable in said bore but rotating with said rotator, a reciprocating member having opposed rack surfaces, and gear connections between said rack surfaces and said rotator whereby the movements of said rack impart rotary movements to said rotator.

62. In apparatus for producing a succession of mold charges of molten glass, the combination with a receptacle for the molten glass having a submerged discharge outlet, of a rigid implement working in the glass in said receptacle in relation to the outlet to control the discharge of glass from the outlet, means to move the implement toward and away from the outlet, and means to rotate said implement comprising a rotator having a bore through which the stem of said implement extends, said implement stem being slidable in said bore but rotating with said rotator, a reciprocating member having opposed rack surfaces, and gear connections between said rack surfaces and said rotator whereby the movements of said rack impart rotary movements to said rotator in a constant direction.

63. In apparatus for producing a succession of mold charges of molten glass, the combination with a receptacle for the molten glass having a submerged discharge outlet, of a rigid implement working in the glass in said receptacle in relation to the outlet to control the discharge of glass from the outlet, means to move the implement toward and away from the outlet, and means to rotate said implement comprising a rotator having a bore through which the stem of said implement extends, said implement stem being slidable in said bore but rotating with said rotator, a reciprocating member having a pair of opposed rack surfaces, and pinions interposed between each of said rack surfaces and said rotator and arranged to alternately impart rotary movement to the latter.

64. In apparatus for producing a succession of mold charges of molten glass, the combination with a receptacle for the molten glass having a submerged discharge outlet, of a rigid implement working in the glass in said receptacle in relation to the outlet to control the discharge of glass from the outlet, means to move the implement toward and away from the outlet, and means to rotate said implement comprising a rotator having a bore through which the stem of said implement extends, said implement stem being slidable in said bore but rotating with said rotator, a reciprocating member having a pair of opposed rack surfaces, and pinions interposed between each of said rack surfaces and said rotator and arranged to alternately impart rotary movement to the latter in a constant direction.

Signed at Swissvale, Pennsylvania, this 30th day of April, 1930.

WILLIAM J. MILLER.